United States Patent
Fouli et al.

(10) Patent No.: US 9,151,268 B1
(45) Date of Patent: Oct. 6, 2015

(54) WAVE ENERGY CONVERTOR USING OSCILLATING PENDULUMS

(71) Applicant: KING SAUD UNIVERSITY, Riyadh (SA)

(72) Inventors: Hesham Rabie Fouli, Riyadh (SA); Ali M. Al-Samhan, Riyadh (SA); Shkelzen Hykaj, Riyadh (SA); Ermal Mullalli, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 14/607,691

(22) Filed: Jan. 28, 2015

(51) Int. Cl.
| | | |
|---|---|---|
| *F03B 13/10* | (2006.01) | |
| *F03B 13/12* | (2006.01) | |
| *F03B 13/20* | (2006.01) | |

(52) U.S. Cl.
CPC . *F03B 13/20* (2013.01); *Y02E 10/38* (2013.01)

(58) Field of Classification Search
CPC ................................. F03B 13/20; Y02E 10/38
USPC ................................................ 290/42, 43, 53
See application file for complete search history.

(56) References Cited

U.S. PATENT DOCUMENTS

| | | | | |
|---|---|---|---|---|
| 1,370,304 | A * | 3/1921 | Godfrey | 185/30 |
| 2,083,306 | A * | 6/1937 | Rooke | 114/327 |
| 3,231,749 | A * | 1/1966 | Hinck, III | 290/53 |
| 4,266,143 | A * | 5/1981 | Ng | 290/53 |
| 8,816,541 | B1 * | 8/2014 | Bristow | 310/36 |
| 2007/0138793 | A1 * | 6/2007 | Zimmerman et al. | 290/1 R |
| 2011/0291418 | A1 * | 12/2011 | Ono | 290/53 |
| 2012/0227485 | A1 * | 9/2012 | Gregory | 73/460 |

\* cited by examiner

*Primary Examiner* — Tulsidas C Patel
*Assistant Examiner* — Thomas Quigley
(74) *Attorney, Agent, or Firm* — Richard C Litman

(57) ABSTRACT

The wave energy convertor using oscillating pendulums includes a buoyant base, a support frame mounted to the buoyant base, and a power generating assembly coupled to the support frame. A plurality of annular rails is disposed on the support frame and a reinforcement member extends diametrically across each annular rail. The power generating assembly includes a plurality of pendulum arms rotatably mounted on a central axle extending coaxially through the reinforcement members. One or more dynamos are mounted to support plates on opposite ends of the pendulum arms, and rotors extend from the dynamos to ride on the inner surface of the annular rails. Undulation of the buoyant base riding the waves of a body of water causes the pendulum arms to oscillate. Rotation of the rotors generates current, which is collected by a current collection assembly and transmitted to an onshore facility for distribution.

15 Claims, 5 Drawing Sheets

WAVE ENERGY CONVERTOR USING OSCILLATING PENDULUMS

BACKGROUND OF THE INVENTION

1. Field of the Invention

The present invention relates to power generators, and particularly to a wave energy convertor using oscillating pendulums that is relatively simple in structure and produces power in an economical manner.

2. Description of the Related Art

Wave energy, or water-wave energy, is one of several alternative sources of energy being pursued as a viable alternative resource for conversion into useful power, such as electricity. The demand for power is relatively high, and due to dwindling resources, such as coal and fossil fuel, economic costs are also on the rise, impacting both the producers and the consumers. Conventional power plants utilizing such fuels as coal, fossil fuel, and even uranium for nuclear power plants, produce wastes that are harmful to the environment. These factors contribute to a persistent demanding need for alternative renewable energy.

Despite existing advances, there is still a need for a power generator harnessing the motion of the waves that is relatively simple and compact in construction and economical in manufacture, maintenance, and production. Thus, a wave energy convertor using oscillating pendulums solving the aforementioned problems is desired.

SUMMARY OF THE INVENTION

The wave energy convertor using oscillating pendulums includes a buoyant base, a support frame mounted to the buoyant base, and a power generating assembly coupled to the support frame. A plurality of annular rails is disposed on the support frame, and a reinforcement member extends diametrically across each annular rail. The power generating assembly includes a plurality of pendulum arms rotatably mounted to a central axle extending coaxially through the reinforcement members. One or more dynamos are mounted to support plates on opposite ends of the pendulum arms, and rotors extend from the dynamos to ride on the inner surface of the annular rails. Undulation of the buoyant base riding the waves of a body of water causes the pendulum arms to oscillate. Rotation of the rotors generates current, which is collected by a current collection assembly and transmitted to an onshore facility for distribution.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1A:
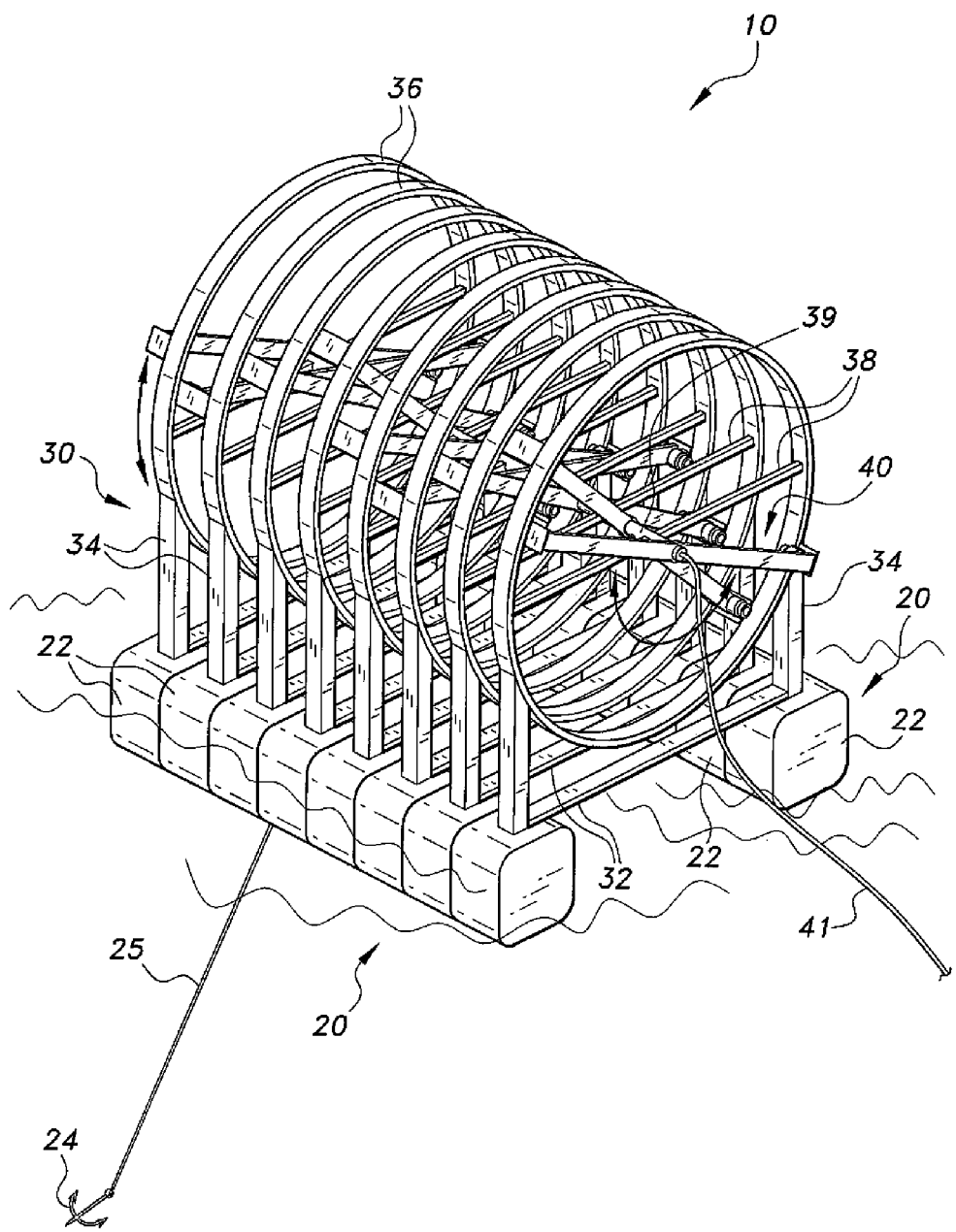
FIG. 1A is an environmental, perspective view of a wave energy convertor using oscillating pendulums according to the present invention.
Figure 1B:
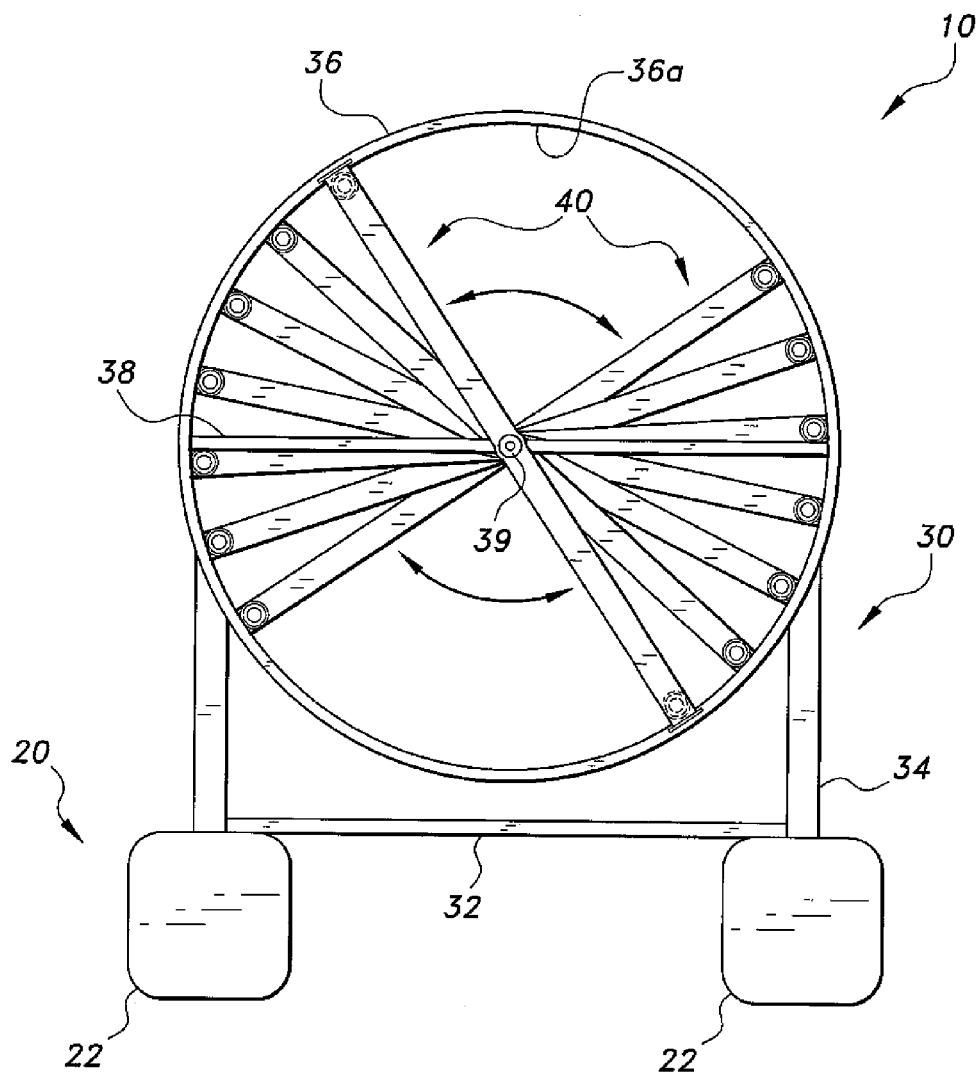
FIG. 1B is an end view of the wave energy convertor of FIG. 1A.

The wave energy convertor using oscillating pendulums, generally referred to by the reference number 10 in the drawings, provides a relatively simple and compact, floating power generating plant that can be easily installed offshore and maintained with minimal costs. As best seen in FIGS. 1A and 1B, the wave energy convertor 10 includes a buoyant base 20, a support frame 30 mounted on top of the buoyant base 20, and a power generator assembly 40 coupled to the support frame 30.

The buoyant base 20 includes at least one pair of spaced floats 22 for each power generating unit of the power generating assembly 40. The floats 22 may be arranged in two parallel rows, as shown in FIG. 1A, each row forming an elongate aggregate float or pontoon. The plurality of separate floats 22 in each row can be connected in series by conventional means, such as fasteners, welds, hinges, latches, ropes, etc. The floats 22 provide a platform for the support frame 30 and the power generator assembly 40 mentioned above. The buoyant base 20 permits the wave energy convertor 10 to float on a body of water, such as the sea, and to passively ride the waves, which causes the buoyant base 20 to rock or undulate on the water. This rocking motion provides the motive force needed by the power generator assembly 40 to facilitate power production.

Each float 22 can be constructed from buoyant materials, such as foam, plastic, wood, and the like, as is known in the art. Each float 22 can be provided as a substantially solid structure or a hollow structure. The substantially solid-type structure can be suitable for most use scenarios where the floating stability of the wave energy convertor 10 is not a substantial concern. In the case of the substantially hollow structure, the floats 22 can be selectively and partially filled with filler material, such as water, sand, and the like, to function as ballast. When so constructed, the floats 22 will be partially submerged in the water, more so than without the added weight of the filler material, to increase the floating stability of the wave energy convertor 10 on the water. The float 22 or pontoon can also be provided as a single, integral elongate body to support multiple arms of the support frame 30, if desired. During use, the buoyant base 20 is substantially fixed at a predetermined or designated relative position on the body of water by an anchor 24 connected to a cable 25 attached to one of the floats 22, or to any other part of the buoyant base 20. The cable 25 can be constructed from chains, sturdy rope, or similar material.

The buoyant base 20 supports the support frame 30 mounted on top of the buoyant base 20. The support frame 30 includes a cross beam, bar, or member 32 connecting each pair of spaced floats 22 per power generating unit. An upright support beam, bar, or member 34 extends upward from each float 22. In each power generating unit, the cross member 32 and the pair of upright support members 34 extending from the pair of floating bodies 22 provide a stable frame for supporting an annular rail 36. Each annular rail 36 is preferably reinforced by a reinforcement beam, bar, or member 38. The reinforcement member 38 spans the diameter of the annular rail 36 and assists in maintaining the general circular shape of the annular rail 36 by substantially preventing warping of the annular rail 36.

The cross members 32 and the upright support members 34 can be provided as substantially square or rectangular beams, as shown in FIGS. 1A and 1B, and they are preferably constructed from sturdy, durable, corrosion-resistant materials that can withstand the elements and the effects of the sea environment. Some examples of corrosion-resistant materials include, but are not limited to, carbon-fiber reinforced plastic, stainless steel, fiberglass, composites, combinations thereof, and the like. The cross members 32 and the upright support members 34 can be provided in any shape, so long as they can provide the required support and corrosion resistance. The cross member 32 is preferably smaller in length than the diameter of the annular rail 36, and the length of the upright support member 34 is preferably longer than the radius of the annular rail 36. This arrangement results in a stable frame for the respective annular rail 36, supporting the same from the bottom thereof so that the respective annular rail 36 is elevated from the corresponding cross member 32.

The annular rail 36 is preferably constructed as a relatively flat, wide circular band made from similar materials as the cross members 32 and upright support members 34. The outer surface of the annular rail 36 can be provided in any shape or form. However, at least a major portion of the inner surface 36a of the annular rail 36 is flat so that a follower for the power generator assembly 40 can ride along the rail, as further described herein.

The support frame 30 also includes a central shaft or axle 39 mounted coaxially through the plurality of annular rails 36. A through hole on each reinforcement member 38 rigidly supports the central axle 39 at the center or axis of each annular rail 36. Wires, which will be further described, run through the central axle 39 to transmit generated current from the power generator assembly 40 to an output transmission line 41. The output transmission line 41 extends from one end of the central axle 39, and can be connected to a plurality of other output transmission lines 41 from other wave energy converters 10 within the vicinity. The output transmission line 41 transmits the generated current to a power collection facility onshore for ultimate distribution onto an existing power grid.

The power generator assembly 40 includes a plurality of pendulum assemblies rotatably mounted on the central axle 39. The pendulum assemblies are freely rotatable on the central axle 39 at spaced intervals along the length of the central axle 39, and each power generating unit of the wave energy convertor 10 can include one or more of the pendulum assemblies.

Figures 2A, 2B:
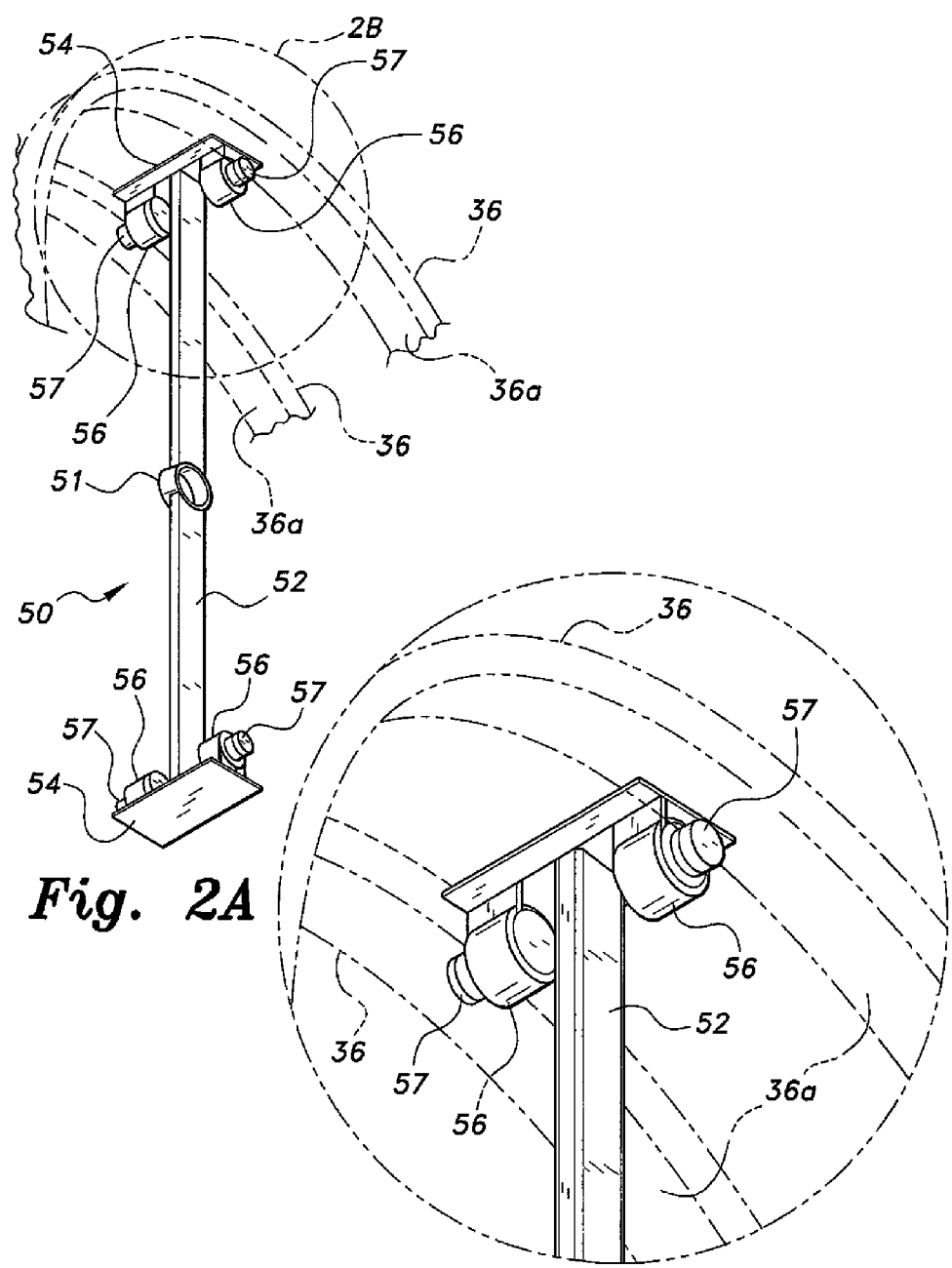
FIG. 2A is a perspective view of a first pendulum assembly in the wave energy convertor of FIG. 1A, shown with annular rails in phantom for clarity, the pendulum arm having quad dynamos mounted thereon.
FIG. 2B is a detailed perspective view showing two dynamos mounted to one end of the pendulum arm of FIG. 2A, the opposite end of the pendulum arm also having two dynamos mounted thereon.

As best seen in FIGS. 2A and 2B, one of the pendulum assemblies is a first or intermediate pendulum assembly 50. Each first pendulum assembly 50 includes an elongate pendulum arm 52 having an annular mounting boss 51 or hub formed or disposed at a center of the elongate pendulum arm 52, the mounting boss 51 facilitating freely rotatable mounting of the pendulum arm 52 about the central axle 39. A support plate 54 is disposed at opposite ends of the pendulum arm 52. Each support plate 54 preferably carries a pair of dynamos 56. Each dynamo 56 includes a rotor or follower 57, the rotors extending in opposite directions with respect to each other. Each rotor 57 frictionally engages the inner surface 36a of its adjacent annular rail 36, as can be seen in FIGS. 2A and 2B. Thus, the first pendulum assembly 50 can be referred to as an intermediate pendulum assembly due to the first pendulum assembly 50 being operationally disposed between adjacent annular rails 36. The first pendulum assembly 50 can also be referred to as a "quad-dynamo pendulum" since the pendulum arm 52 carries four dynamos 56. Due to the above arrangement of the dynamos 56, the annular rail 36 is preferably wide enough to accommodate the rotors 57 and the reinforcement member 38 without potentially interfering with each other during travel of the rotors 57.

In use, as the wave energy convertor 10 undulates on the water by the motion of the waves, the pendulum arm 52 reacts by oscillating about the central axle 39. This causes the rotors 57 to rotate and roll along the respective inner surfaces 36a in an arc. The rotation of the rotors 57 generates electrical current, which is transmitted to a current collection assembly 70 coupled to the mounting boss 51. Each mounting boss 51 includes a watertight or waterproof frictionless bearing 71, such as a thrust bearing, to facilitate free rotatable movement of the pendulum arm 52. The dynamos 56 are preferably disposed on opposite ends of the pendulum arm 52 so that the pendulum arm 52 is balanced by acting as counterweights for each other. The balanced pendulum arm 52 and the frictionless bearing 71 allows the pendulum arm 52 to readily oscillate, even with minimal water wave activity, thereby facilitating relatively constant current generation.

Figure 3A:
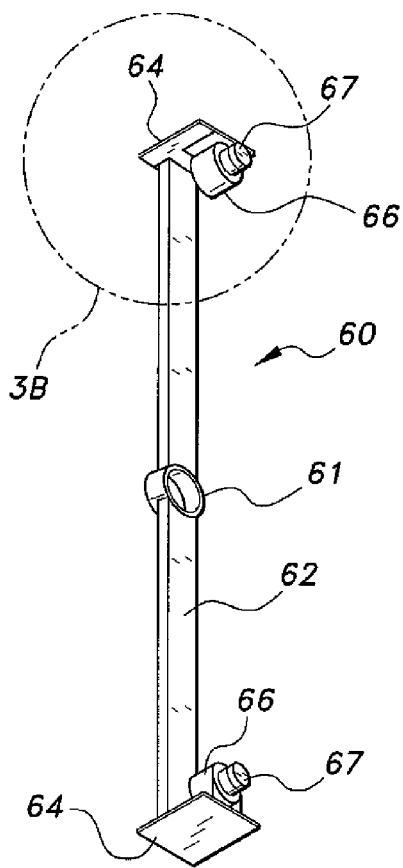
FIG. 3A is a perspective view of a second pendulum assembly in the wave energy convertor of FIG. 1A, the second pendulum assembly having dual dynamos mounted thereon.
Figure 3B:
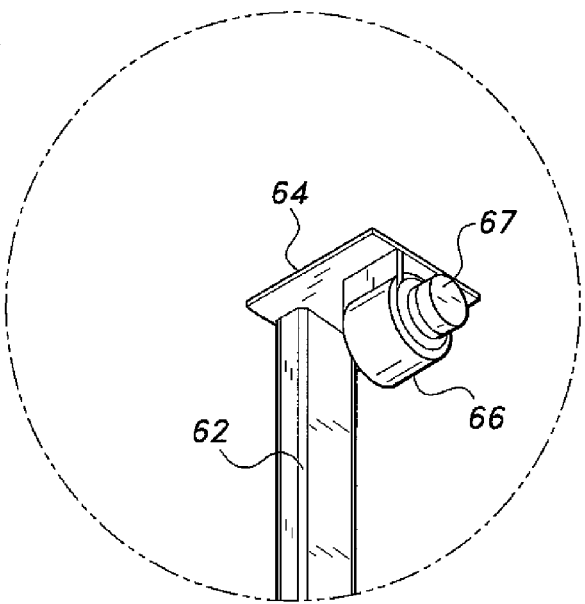
FIG. 3B is a detailed perspective view showing a single two dynamo mounted to one end of the pendulum arm of FIG. 2A, the opposite end of the pendulum arm also having a single dynamo mounted thereon.

As best seen in FIGS. 3A and 3B, another one of the pendulum assemblies is a second or end pendulum assembly 60. Each second pendulum assembly 60 includes an elongate pendulum arm 62 having an annular mounting boss 61 or hub formed or disposed at a center of the elongate pendulum arm 62, the mounting boss 61 facilitating freely rotatable mounting of the pendulum arm 62 about the central axle 39. A support plate 64 is disposed at opposite ends of the pendulum arm 62. Each support plate 64 preferably carries a single dynamo 66. Each dynamo 66 includes a rotor or follower 67 facing in the same direction as the other. Each rotor 67 frictionally engages the inner surface 36a of an adjacent annular rail 36. Unlike the first pendulum assembly 50, the second pendulum assembly 60 is configured to be disposed at the ends of the water energy convertor 10. Thus, the second pendulum assembly 60 can be referred to as an end pendulum assembly due to the second pendulum assembly 60 being operationally disposed adjacent to one of the rails 36 at opposite ends of the water energy convertor. The second pendulum assembly 60 can also be referred to as a "duo-dynamo pendulum" since the pendulum arm 62 carries two dynamos 66. In all other respects, the second pendulum assembly 60 functions substantially the same as the first pendulum assembly 50 in that the rotation of the rotors 67 on the dynamos 66 as the rotors 67 roll along the inner surface 36a of the corresponding annular rail 36 generates electrical current that collects at the current collection assembly 70 for post transmission.

Figure 4:
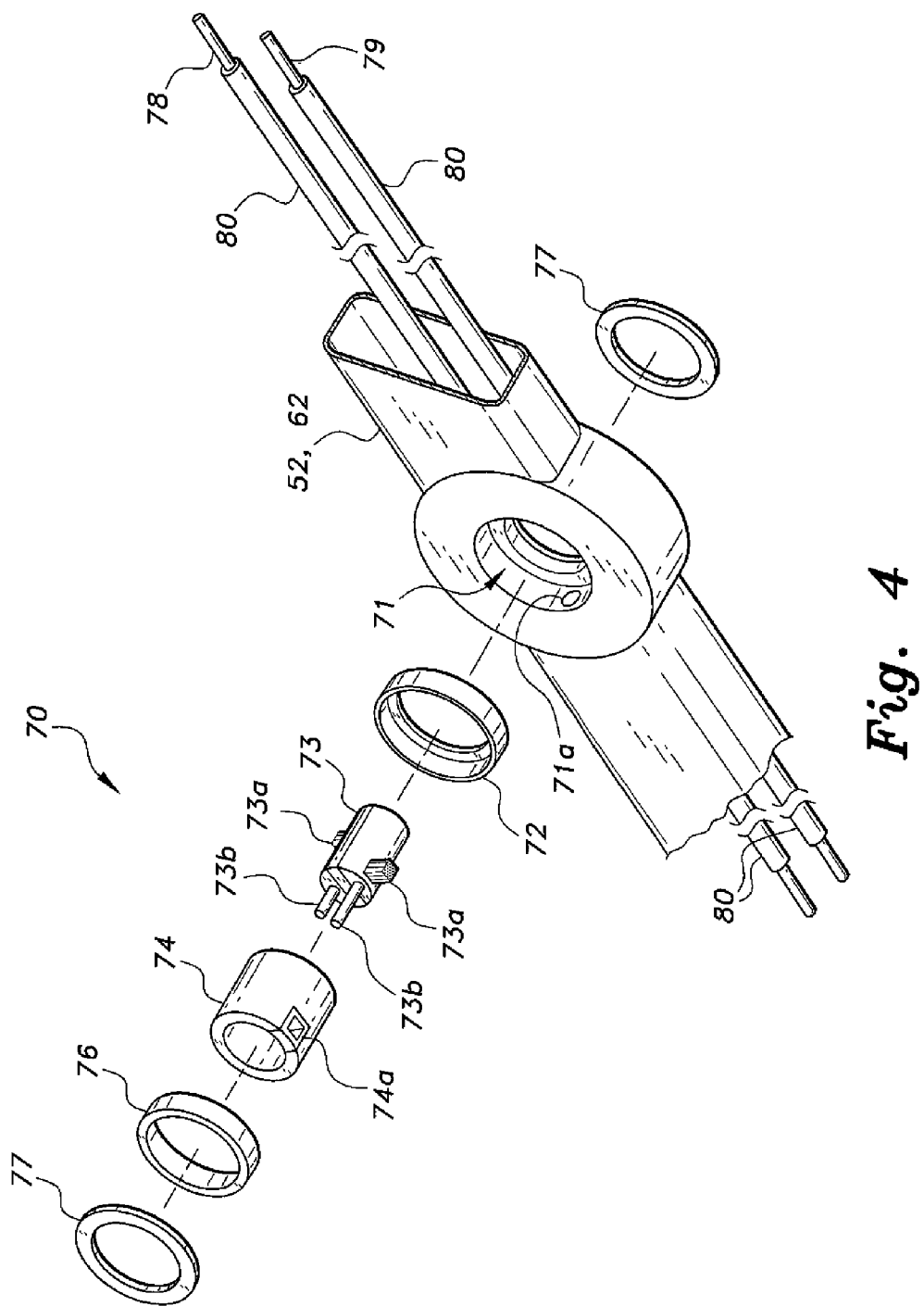
FIG. 4 is an exploded perspective view of the current collector assembly in the first and second pendulum assemblies of FIGS. 2A and 3A.

Referring to FIG. 4, each pendulum arm 52, 62 includes the current collection assembly 70 mounted inside the frictionless bearing 71. The current collection assembly 70 includes current collector member or commutator 73 mounted inside a hollow cylindrical sleeve 74. At least one pair of brushes 73a extend radially from the outer surface of the commutator 73, and each brush 73a extends through respective brush insulation frames 74a on the cylindrical sleeve 74. The brushes 73a are preferably disposed at different spaced locations on the surface of the commutator 73. When assembled, the cylindrical shaft 74 extends through the opening of the frictionless bearing 71 with a brush 73a on either side of the opening.

Conductor wires, such as the positive conductor wire 78 and negative conductor wire 79, transmit the generated current from the dynamos 56, 66 to respective contacts 71a inside the mounting bosses 51, 61. Both the positive conductor wire 78 and the negative conductor wire 79 are preferably covered by an insulated sleeve 80. Each mounting boss 51, 61 includes another contact 71a diametrically opposite on the other side of the frictionless bearing 71. A copper sleeve 72 is mounted to one side of the opening of the frictionless bearing 71, and a copper conductor sleeve 76 is mounted to the other side such that opposite ends of the commutator 73 are respectively enclosed by the copper sleeve 72 and copper conductor sleeve 76. The copper sleeve 72 and the copper conductor sleeve 76 are in contact or communication with the respective contacts 71a to permit current to flow therein. When assembled, the brushes 73a extend out of the respective insulation frames 74a a certain distance to contact the copper sleeve 72 and the copper conductor sleeve 76, respectively.

By this construction, conductive contact between the current collection assembly 70 and the contacts 71a is maintained throughout the oscillating motion of the pendulum arms 52, 62. The current transmitted to the commutator 73 from the dynamos 56, 66 is transmitted to the output line 41 via the transmission cables 73b extending from one end of the commutator 73. An insulation ring 77 caps opposite ends of the collection assembly 70 to seal the same onto the mounting boss 51, 61.

Thus, the wave energy convertor 10 provides a relative compact floating power plant capable of generating electrical power with minimal expense and effort in operating the dynamos 56, 66. Compared to conventional hydropower systems, the wave energy convertor 10 occupies much less space and costs less to manufacture and maintain.

It is to be understood that the present invention is not limited to the embodiments described above, but encompasses any and all embodiments within the scope of the following claims.

We claim:

1. A wave energy convertor using oscillating pendulums, comprising:
    a buoyant base adapted to float on a body of water and ride on waves;
    a support frame mounted to the buoyant base, the support frame having:
        at least one annular rail, the at least one annular rail having an inner surface;
        a reinforcement member extending diametrically across the at least one annular rail; and
        a central axle extending concentrically through the at least one annular rail, the central axle being rigidly mounted on and extending through the reinforcement member; and
    a power generating assembly coupled to the support frame, the power generating assembly having:
        at least one pendulum assembly rotatably mounted on the central axle; and
        at least one dynamo mounted on the at least one pendulum assembly, the dynamo having a rotor extending therefrom, the rotor frictionally engaging the inner surface of the at least one annular rail to roll thereon and generate current;
    wherein undulating motion of the buoyant base from passing water waves causes the at least one pendulum assembly to oscillate, whereby the rotor rolls along the inner surface of the at least one annular rail to generate current for subsequent collection and distribution.

2. The wave energy convertor according to claim 1, further comprising an output line extending from the central axle, the output line being adapted for transmitting current collected from the at least one dynamo to an onshore facility for subsequent distribution.

3. The wave energy convertor according to claim 1, wherein said buoyant base comprises at least one pair of spaced floats.

4. The wave energy convertor according to claim 3, wherein said at least one pair of spaced floating bodies comprises a plurality of pairs of spaced floating bodies coupled together to form a pair of elongate pontoons.

5. The wave energy convertor according to claim 3, wherein said support frame comprises:
    a cross member spanning between said at least one pair of spaced floats; and
    an upright support member extending upward from atop of each of the floats, respectively, a pair of the upright support members supporting said at least one annular rail thereon at an elevated position above the corresponding cross member.

6. The wave energy convertor according to claim 5, wherein said cross member has a length smaller than the diameter of said at least one annular rail, and wherein said upright support member has a length greater than the radius of said at least one annular rail.

7. The wave energy convertor according to claim 1, further comprising an output line extending from the central axle, said at least one pendulum assembly including:
    a plurality of pendulum assemblies including a pair of end pendulum assemblies disposed at opposite ends of said central axle and at least one intermediate pendulum assembly mounted on said central axle between the end pendulum assemblies; and
    a current collection assembly coupled to the at least one intermediate pendulum assembly to collect and transmit generated current to the output line.

8. The wave energy convertor according to claim 7, wherein said at least one intermediate pendulum assembly comprises:
    an elongate pendulum arm having a center and an annular mounting boss formed at the center of the elongate pendulum arm;
    a bearing disposed in the mounting boss, the bearing being mounted on said central axle to facilitate free rotation of the pendulum arm, the current collection assembly being coupled to the bearing; and
    a support plate disposed at opposite ends of the pendulum arm, the at least one dynamo comprising a pair of dynamos mounted on each of the support plates, the rotors of the dynamos in each pair of the dynamos extending in opposite directions.

9. The wave energy convertor according to claim 8, wherein said current collection assembly comprises:
    at least one pair of electrical contacts inside said bearing, each of the contacts being disposed at different positions;
    conductor wires extending from said dynamos towards a respective one of the electrical contacts to facilitate transmission of the generated current;
    a hollow cylindrical sleeve extending through said bearing, the cylindrical sleeve having at least one pair of insulation frames thereon;
    a commutator mounted inside the cylindrical sleeve, the commutator having at least one pair of brushes radially extending from an outer surface of the commutator and at least one pair of transmission cables extending from one end of the commutator, each of the brushes extending partially through a respective one of the insulation frames;

a copper sleeve enclosing one end of the commutator, the copper sleeve intermittently contacting one of the electrical contacts and one of the brushes;

a copper conductor sleeve enclosing the opposite end of the commutator, the copper conductor sleeve intermittently contacting the other of the electrical contacts and the other of the brushes; and an insulation ring capping opposite ends of the collection assembly to seal the collection assembly onto the mounting boss;

wherein the brushes collect and transmit the generated current, via contact with the copper sleeve and the copper conductor sleeve, through the transmission cables towards said output line when the pendulum arm oscillates.

10. The wave energy convertor according to claim 7, wherein each said end pendulum assembly has a current collection assembly coupled thereto to collect and transmit the generated current to said output line.

11. The wave energy convertor according to claim 10, wherein each said end pendulum assembly comprises:
an elongate pendulum arm having a center and an annular mounting boss formed at the center of the elongate pendulum arm;
a bearing disposed in the mounting boss, the bearing being mounted on said central axle to facilitate free rotation of the pendulum arm, the current collection assembly being coupled to the bearing; and
a support plate disposed at opposite ends of the pendulum arm, said at least one dynamo comprising a single dynamo mounted on each of the support plates, the rotors of the dynamos extending parallel to each other.

12. The wave energy convertor according to claim 11, wherein said current collection assembly comprises:
at least one pair of electrical contacts inside said bearing, each of the contacts being disposed at different positions;
conductor wires extending from said dynamos towards a respective one of the electrical contacts to facilitate transmission of the generated current;
a hollow cylindrical sleeve extending through said bearing, the cylindrical sleeve having at least one pair of insulation frames thereon;
a commutator mounted inside the cylindrical sleeve, the commutator having at least to one pair of brushes radially extending from an outer surface of the commutator and at least one pair of transmission cables extending from one end of the commutator, each of the brushes extending partially through a respective one of the insulation frames;
a copper sleeve enclosing one end of the commutator, the copper sleeve intermittently contacting one of the electrical contacts and one of the brushes;
a copper conductor sleeve enclosing the opposite end of the commutator, the copper conductor sleeve intermittently contacting the other of the electrical contacts and the other of the brushes; and
an insulation ring capping opposite ends of the collection assembly to seal the collection assembly onto the mounting boss;
wherein the brushes collect and transmit the generated current, via contact with the copper sleeve and the copper conductor sleeve, through the transmission cables towards said output line when the pendulum arm oscillates.

13. The wave energy convertor according to claim 1, wherein said support frame is constructed from durable, corrosion-resistant material.

14. The wave energy convertor according to claim 13, wherein said durable corrosion-resistant material comprises at least one material selected from the group consisting of carbon-fiber reinforced plastic, stainless steel, fiberglass, and composites.

15. The wave energy convertor according to claim 1, further comprising an anchor cable and anchor assembly coupled to the buoyant base to selectively maintain relative position of the wave energy convertor at a select location on the body of water.

* * * * *